United States Patent
Kim et al.

(10) Patent No.: US 12,528,277 B2
(45) Date of Patent: Jan. 20, 2026

(54) APPARATUS AND METHOD FOR MANUFACTURING DISPLAY DEVICE

(71) Applicant: SAMSUNG DISPLAY CO., LTD., Yongin-si (KR)

(72) Inventors: Sanghoon Kim, Yongin-si (KR); Hyunji Lee, Yongin-si (KR); Byunghoon Kang, Yongin-si (KR); Sunghoon Kim, Yongin-si (KR); Jingyu Sim, Yongin-si (KR); Minhoon Choi, Yongin-si (KR); Seongjin Hwang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 259 days.

(21) Appl. No.: 18/319,662

(22) Filed: May 18, 2023

(65) Prior Publication Data
US 2024/0140080 A1  May 2, 2024

(30) Foreign Application Priority Data
Oct. 26, 2022  (KR) .......................... 10-2022-0139626

(51) Int. Cl.
*B32B 37/00* (2006.01)
*B32B 37/06* (2006.01)
(Continued)

(52) U.S. Cl.
CPC .......... *B32B 37/0046* (2013.01); *B32B 37/06* (2013.01); *B32B 37/08* (2013.01);
(Continued)

(58) Field of Classification Search
CPC ..... B32B 37/0046; B32B 37/06; B32B 37/08; B32B 2260/02; B32B 2260/04;
(Continued)

(56) References Cited

U.S. PATENT DOCUMENTS

| | | | |
|---|---|---|---|
| 2015/0041435 A1* | 2/2015 | Gu .................... | C03C 21/002 427/299 |
| 2016/0326051 A1* | 11/2016 | Kim .................. | C03C 21/002 |
| 2022/0091637 A1 | 3/2022 | Kuon et al. | |

FOREIGN PATENT DOCUMENTS

| CN | 112062456 A | * 12/2020 |
|---|---|---|
| JP | 2012250905 A | * 12/2012 |

(Continued)

OTHER PUBLICATIONS

CN112062456A Machine Translation of Description (Year: 2025).*
JP2012250905A Machine Translation of Description (Year: 2025).*
WO2015/079768A1 Machine Translation of Description (Year: 2025).*

*Primary Examiner* — Cynthia L Schaller
(74) *Attorney, Agent, or Firm* — F. CHAU & ASSOCIATES, LLC

(57) ABSTRACT

An apparatus for manufacturing a display device includes a stacking unit capable of moving to a first location, a second location, and a third location, and stacking glass cover windows, each glass cover window including a folding region having a glass pattern extending in a first direction, a reinforcing unit arranged at the first location and containing a reinforcing solution such that the glass cover windows stacked in the stacking unit are submerged in the reinforcing solution, a heating unit arranged at the second location and heating the glass cover windows stacked in the stacking unit, and a cooling unit arranged at the third location and cooling the glass cover windows stacked in the stacking unit. At the second location, the stacking unit is arranged such that the first direction is parallel to a second direction in which a gravitational force is applied.

20 Claims, 12 Drawing Sheets

(51) Int. Cl.
*B32B 37/08* (2006.01)
*H05K 5/03* (2006.01)

(52) U.S. Cl.
CPC ............ *H05K 5/03* (2013.01); *B32B 2260/02* (2013.01); *B32B 2260/04* (2013.01); *B32B 2315/08* (2013.01); *B32B 2457/20* (2013.01)

(58) Field of Classification Search
CPC . B32B 2315/08; B32B 2457/20; B32B 17/06; H05K 5/03; G02F 1/1333; H01L 21/67313; H10K 71/00; B65D 81/05; B65D 85/48
See application file for complete search history.

(56) References Cited

FOREIGN PATENT DOCUMENTS

| | | |
|---|---|---|
| JP | 2021-031371 | 3/2021 |
| KR | 10-0826847 | 5/2008 |
| KR | 10-2013-0098930 | 9/2013 |
| KR | 10-1316279 | 10/2013 |
| KR | 10-2067465 | 1/2020 |
| WO | WO2015/079768 A1 * | 4/2015 |

* cited by examiner

APPARATUS AND METHOD FOR MANUFACTURING DISPLAY DEVICE

CROSS-REFERENCE TO RELATED APPLICATION

This application is based on and claims priority under 35 U.S.C. § 119 to Korean Patent Application No. 10-2022-0139626, filed on Oct. 26, 2022, in the Korean Intellectual Property Office, the disclosure of which is incorporated by reference herein in its entirety.

BACKGROUND

1. Field

One or more embodiments relate to an apparatus and method, and more particularly, to an apparatus and method for manufacturing a display device.

2. Description of the Related Art

Electronic devices based on mobility are widely used. Recently, tablet personal computers (PCs), in addition to small-sized electronic devices such as mobile phones, have been widely used as mobile electronic devices.

To support various functions, such mobile electronic devices include display devices to provide visual information, such as an image and a video, to a user. Recently, with the miniaturization of components for driving the display devices, proportions of the display devices occupying the electronic devices are gradually increasing, and the display devices having structures that are bendable from flat states to have certain angles are also being developed.

SUMMARY

One or more embodiments include an apparatus and method for manufacturing a display device, in which a phenomenon in which glass is folded during a reinforcing process of the glass is reduced and residual salt remaining in the glass is efficiently removed.

Additional aspects will be set forth in part in the description which follows and, in part, will be apparent from the description, or may be learned by practice of the presented embodiments of the disclosure.

According to one or more embodiments, an apparatus for manufacturing a display device includes a stacking unit capable of moving to a first location, a second location, and a third location, and stacking a plurality of glass cover windows, each glass cover window including a folding region having a glass pattern extending in a first direction, a reinforcing unit arranged at the first location and containing a reinforcing solution such that the plurality of glass cover windows stacked in the stacking unit are submerged in the reinforcing solution, a heating unit arranged at the second location and heating the plurality of glass cover windows stacked in the stacking unit, and a cooling unit arranged at the third location and cooling the plurality of glass cover windows stacked in the stacking unit. At the second location, the stacking unit is arranged such that the first direction is parallel to a second direction in which a gravitational force is applied. The stacking unit includes a stacking frame providing an internal space, and a plurality of support portions connected to the stacking frame and arranged in the internal space. The plurality of support portions contact sides of each glass cover window of the plurality of glass cover windows.

Each support portion of the plurality of support portions may be spaced apart from the folding region.

Two support portions of the plurality of support portions contact two sides of each glass cover window of the plurality of glass cover windows, respectively. The two sides are spaced apart from each other in a direction perpendicular to the first direction, with the folding region between the two sides.

The sides of the plurality of glass cover windows include four sides of each glass cover window of the plurality of glass cover windows.

At least one of the plurality of support portions may be detachable from the stacking frame.

Each support portion of the plurality of support portions includes a plurality of support grooves accommodating a side of each glass cover window of the plurality of glass cover window.

The stacking unit further includes a heat transfer member connected to the stacking frame and arranged in the internal space. The heat transfer member transfers heat to the folding region.

The heat transfer member is spaced apart from the folding region in the first direction. At the third location, the stacking unit is arranged such that the first direction is parallel to the second direction.

According to one or more embodiments, an apparatus for manufacturing a display device includes a stacking unit configured to stack a plurality of glass cover windows, each glass cover window including a folding region having a glass pattern extending in a first direction. The stacking unit includes a stacking frame providing an internal space, a plurality of support portions connected to the stacking frame and arranged in the internal space and contacting sides of each glass cover window, and a heat transfer member connected to the stacking frame and arranged in the internal space. The heat transfer member transfers heat to the folding region.

The heat transfer member may be spaced apart from the folding region, in the first direction.

Each support portion of the plurality of support portions may be spaced apart from the folding region.

Two support portions of the plurality of support portions contact two sides of each glass cover window of the plurality of glass cover windows, respectively. The two sides are spaced apart from each other in a direction perpendicular to the first direction, with the folding region between the two sides.

The sides of the plurality of glass cover windows include four sides of each glass cover window of the plurality of glass cover windows.

At least one of the plurality of support portions may be detachable from the stacking frame.

Each support portion of the plurality of support portions includes a plurality of support grooves accommodating a side of each glass cover window of the plurality of glass cover window.

According to one or more embodiments, a method of manufacturing a display device includes stacking, in a stacking unit, a plurality of glass cover windows, each glass cover window of the plurality of glass cover windows including a folding region having a glass pattern extending in a first direction, immersing the stacking unit in a reinforcing solution such that the plurality of glass cover windows stacked in the stacking unit are submerged in the reinforcing solution, heating the plurality of glass cover windows stacked in the stacking unit, and cooling the plurality of glass cover windows stacked in the stacking unit. The heating of the plurality of glass cover windows stacked in the stacking unit includes arranging the stacking unit such that the first direction is parallel to a second direction in which a gravitational force is applied.

The cooling of the plurality of glass cover windows stacked in the stacking unit includes arranging the stacking unit such that the first direction is parallel to the second direction.

The cooling of the glass stacked in the stacking unit may further include transferring heat to the folding region.

The method further includes separating at least one of the plurality of support portions connected to a stacking frame and contacting sides of each glass cover window of the plurality of glass cover windows from the stacking frame, taking the plurality of glass cover windows out of the stacking unit, staking new glass in the stacking unit, and mounting the separated at least one support portion on the stacking frame.

Other aspects, features, and advantages may become clear from the following drawings, the claims, and the detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
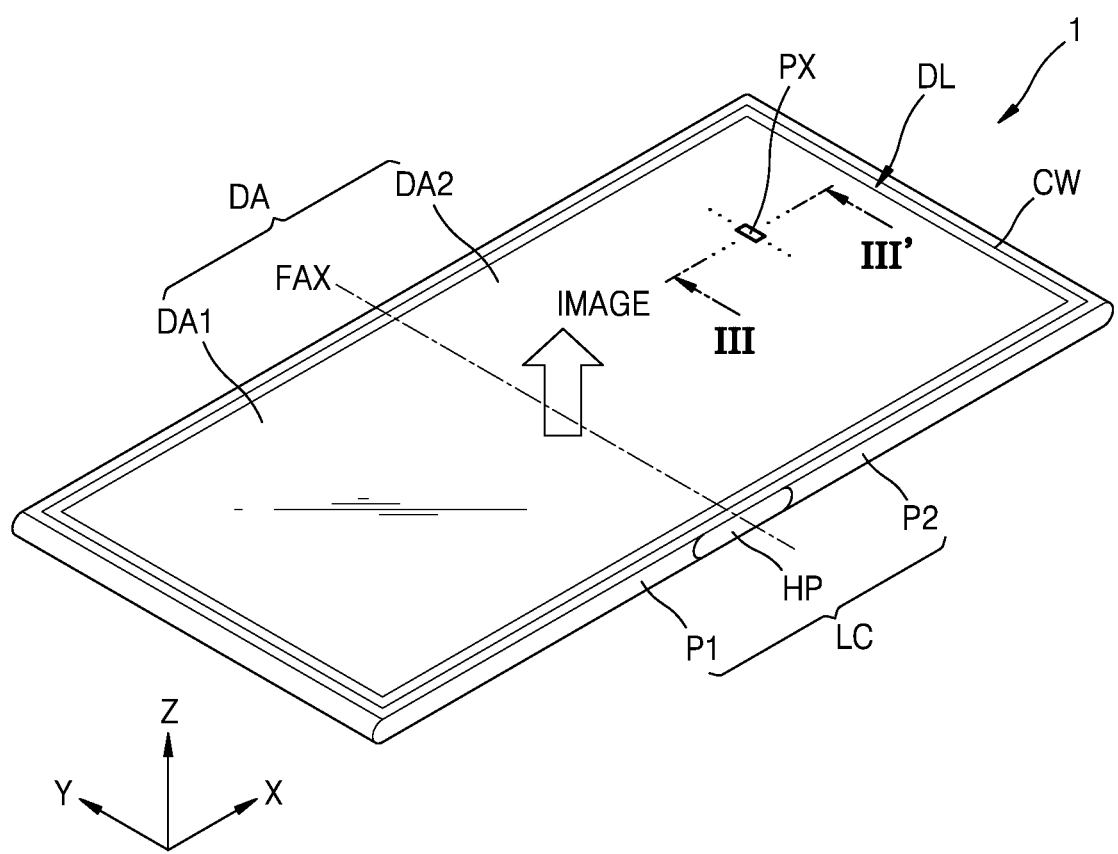
FIG. 1 is a perspective view of a portion of a display device, according to an embodiment of the present disclosure.

The disclosure may have various modifications and various embodiments, and specific embodiments are illustrated in the drawings and are described in detail in the detailed description. Effects and features of the disclosure and methods of achieving the same will become apparent with reference to embodiments described in detail with reference to the drawings. However, the disclosure is not limited to the embodiments described below, and may be implemented in various forms.

Hereinafter, embodiments will be described in detail with reference to the accompanying drawings, and in the following description with reference to the drawings, like reference numerals refer to like elements and redundant descriptions thereof will be omitted.

As used herein, the term "and/or" includes any and all combinations of one or more of the associated listed items.

In the following embodiments, the terms "first" and "second" are not used in a limited sense and are used to distinguish one component from another component.

In the following embodiments, an expression used in the singular encompasses the expression of the plural, unless it has a clearly different meaning in the context.

In the following embodiments, it will be further understood that the terms "comprise" and/or "comprising" used herein specify the presence of stated features or components, but do not preclude the presence or addition of one or more other features or components.

It will be understood that when a layer, region, or element is referred to as being "formed on" another layer, area, or element, it can be directly or indirectly formed on the other layer, region, or element. That is, for example, intervening layers, regions, or elements may be present.

In the drawings, for convenience of description, sizes of components may be exaggerated or reduced. In other words, because sizes and thicknesses of components in the drawings are arbitrarily illustrated for convenience of explanation, the disclosure is not necessarily limited thereto.

According to embodiments, an x-axis, a y-axis, and a z-axis are not limited to three axes on an orthogonal coordinate system, but may be interpreted in a broad sense including the three axes. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Figure 2:
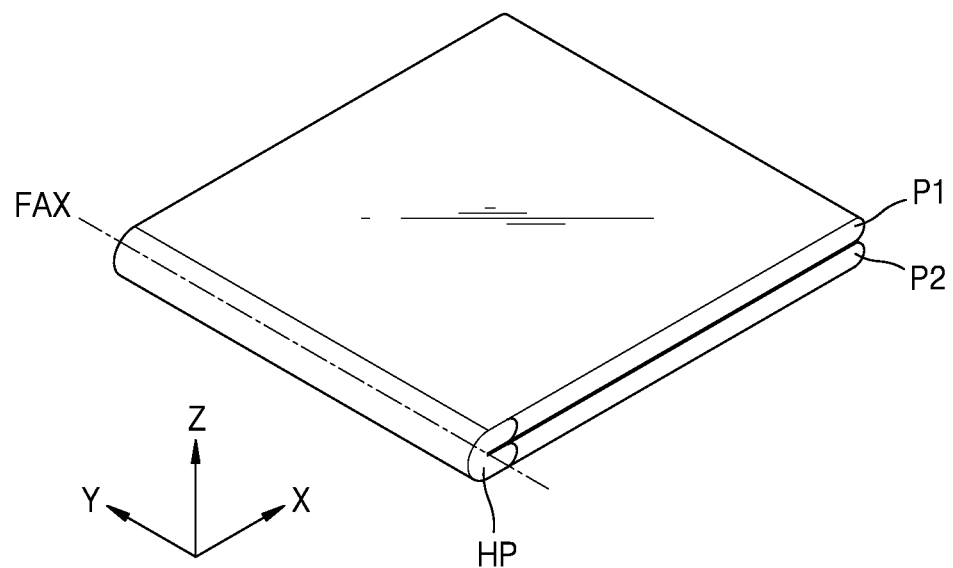
FIG. 2 is a perspective view of a portion of a display device, according to an embodiment of the present disclosure.

FIGS. 1 and 2 are perspective views of portions of a display device 1, according to an embodiment. FIG. 1 illustrates the display device 1 being unfolded, and FIG. 2 illustrates the display device 1 being folded.

Referring to FIGS. 1 and 2, the display device 1 may include a lower cover LC, a display layer DL, and a cover window CW.

The lower cover LC may include a first portion P1 and a second portion P2, which support the display layer DL. The lower cover LC may be folded based on a folding axis FAX defined between the first portion P1 and the second portion P2. According to an embodiment, the lower cover LC may further include a hinge portion HP, and the hinge portion HP may be provided between the first portion P1 and the second portion P2.

The display layer DL may include a display area DA. The display layer DL may be configured to provide an image through an array of a plurality of pixels PX arranged in the display area DA. Each pixel PX may be defined as an emission area emitting light by a light-emitting element electrically connected to a pixel circuit. According to an embodiment, each pixel PX may emit red, green, or blue light. Alternatively, each pixel PX may emit red, green, blue, or white light.

The light-emitting element included in the display layer DL may include an organic light-emitting diode, an inorganic light-emitting diode, a micro light-emitting diode, and/or a quantum dot emitting diode. Hereinafter, for convenience of descriptions, a case where the light-emitting element included in the display layer DL includes an organic light-emitting diode is mainly described, but details described below are not limited thereto and may also be applied to a case where another type of light-emitting element is included.

The display area DA may include a first display area DA1 and a second display area DA2 provided on opposite sides based on the folding axis FAX crossing the display area DA. The first display area DA1 and the second display area DA2 may be arranged on the first portion P1 and the second portion P2 of the lower cover LC, respectively. The display layer DL may provide a first image and a second image by using lights emitted from the plurality of pixels PX arranged in the first display area DA1 and the second display area DA2. According to an embodiment, the first image and the second image may be portions of an image provided through the display area DA of the display layer DL. According to an embodiment, the display layer DL may provide the first image and the second image, which are independent from each other.

The display layer DL may be folded based on the folding axis FAX. For example, the display layer DL may be folded or unfolded along or around the folding axis FAX. When the display layer DL is folded, the first display area DA1 and the second display area DA2 of the display layer DL may face each other.

In FIGS. 1 and 2, the folding axis FAX extends in a Y-axis direction, but the disclosure is not limited thereto. According to an embodiment, the folding axis FAX may extend in an X-axis direction crossing the Y-axis direction. Alternatively, the folding axis FAX may extend in a direction crossing the X-axis direction and Y-axis direction, on an XY plane.

FIGS. 1 and 2 show the display layer DL with a single folding axis FAX, but the disclosure is not limited thereto. According to an embodiment, the display layer DL may be folded a plurality of times based on two or more folding axes FAX crossing the display area DA. For example, the display layer DL may be folded or unfolded along or around each folding axis of the two or more folding axes FAX.

The cover window CW may be disposed on the display layer DL and cover the display layer DL. The cover window CW may be folded or curved according to external force, without generation of a crack or the like. When the display layer DL is folded based on the folding axis FAX, the cover window CW may also be folded together.

Figure 3:
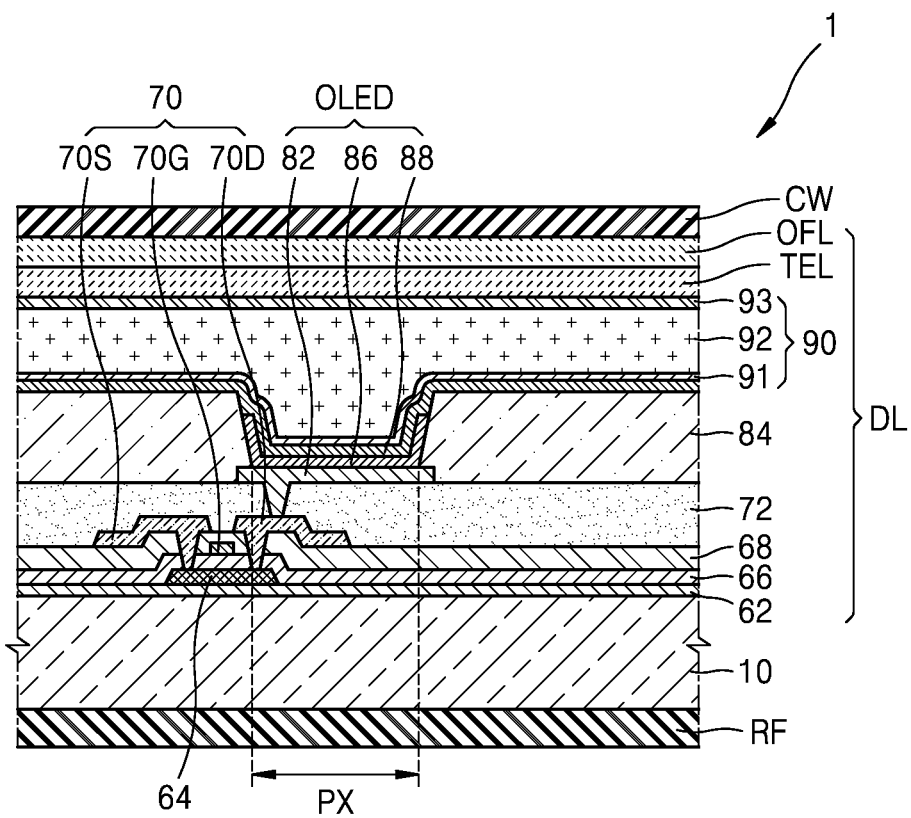
FIG. 3 is a cross-sectional view of a portion of a display device, according to an embodiment of the present disclosure.

FIG. 3 is a cross-sectional view of a portion of the display device 1, according to an embodiment. FIG. 3 may correspond to a cross-sectional view of the display device 1 taken along line III-III' of FIG. 1.

The display layer DL may include, for example, one of an organic light-emitting device (OLED), a liquid crystal display (LCD), and an electrophoretic display (EPD), but is not limited thereto. Hereinafter, a case where the display layer DL is an OLED will be described as an example.

The display layer DL may include the OLED including a pixel electrode 82 arranged on a first substrate 10, a pixel-defining layer 84 arranged on the pixel electrode 82 and including an opening exposing at least a portion of the pixel electrode 82, an intermediate layer 86 disposed on the pixel electrode 82 and including an organic emission layer, and an opposite electrode 88 (i.e., a common electrode) disposed on the intermediate layer 86.

Referring to FIG. 3, a reinforcing substrate RF may be disposed below the first substrate 10. The reinforcing substrate RF is a substrate for supporting the display device 1 from the first substrate 10 to the cover window CW through the display layer DL. The reinforcing substrate RF may include a reinforcing body and a reinforcing layer described below. The reinforcing substrate RF may prevent a crease phenomenon in a folding region of the display layer DL, caused by repeated folding.

A buffer layer 62 including an organic material, such as silicon oxide, silicon nitride, and silicon oxynitride, may be disposed on the first substrate 10. The buffer layer 62 may enhance flatness of a top surface of the first substrate 10 or may prevent impurities from penetrating from the first substrate 10 to an active layer 64 of a thin-film transistor 70, thereby reducing impurities in the active layer 64. In some cases, the buffer layer 62 may be omitted.

The thin-film transistor 70 may be arranged on the first substrate 10, and the thin-film transistor 70 may be electrically connected to the pixel electrode 82. The thin-film transistor 70 may include the active layer 64 including a semiconductor material, such as amorphous silicon, polycrystalline silicon, an oxide semiconductor, and an organic semiconductor material, a gate electrode 70G insulated from the active layer 64, and a source electrode 70S and a drain electrode 70D each electrically connected to the active layer 64. The gate electrode 70G is arranged on the active layer 64, and the source electrode 70S and the drain electrode 70D electrically communicate with each other according to a signal applied to the gate electrode 70G. The gate electrode 70G may be a single layer or multi-layer including one or more materials from among, for example, aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and copper (Cu). The material of the gate electrode 70G may be selected based on adhesiveness to an adjacent layer, surface flatness of a layer being stacked, and processability.

A first insulating layer 66 including an inorganic material, such as silicon oxide, silicon nitride, and silicon oxynitride, may be provided between the active layer 64 and the gate electrode 70G, so as to secure insulation of the active layer 64 and gate electrode 70G. In addition, a second insulating layer 68 including an inorganic material, such as silicon oxide, silicon nitride, and silicon oxynitride, may be arranged on the gate electrode 70G, and the source electrode 70S and the drain electrode 70D may be disposed on the second insulating layer 68. The source electrode 70S and the drain electrode 70D are each electrically connected to the active layer 64 through contact holes formed in the second insulating layer 68 and first insulating layer 66.

A third insulating layer 72 covering the thin-film transistor 70 may be disposed on the thin-film transistor 70. The third insulating layer 72 may have a flat top surface such that the pixel electrode 82 is flat. The third insulating layer 72 may include an organic material such as acryl, benzo cyclobutene (BCB), polyimide, and hexamethyldisiloxane (HMDSO). In FIG. 3, the third insulating layer 72 is a single layer, but the third insulating layer 72 may be a multi-layer.

The third insulating layer 72 includes a via hole exposing one of the source electrode 70S and the drain electrode 70D of the thin-film transistor 70, and the pixel electrode 82 is electrically connected to the thin-film transistor 70 by contacting one of the source electrode 70S and the drain electrode 70D through the via hole. In FIG. 3, the pixel electrode 82 is connected to the drain electrode 70D as an example.

An organic light-emitting diode OLED including the pixel electrode 82, the intermediate layer 86 including an organic emission layer and disposed on the pixel electrode 82, and the opposite electrode 88 is disposed on the third insulating layer 72.

The pixel electrode 82 may be a reflective electrode. When the pixel electrode 82 is the reflective electrode, the pixel electrode 82 may include a reflective layer including Ag, Mg, Al, Pt, Pd, Au, Ni, Nd, Ir, Cr, or a compound thereof, and a transparent conductive layer disposed on and/or below the reflective layer. The transparent conductive layer may include at least one selected from the group consisting of indium tin oxide (ITO), indium zinc oxide (IZO), zinc oxide (ZnO), indium oxide (In$_2$O$_3$), indium gallium oxide (IGO), and Al-doped ZnO (AZO). The disclosure is not limited thereto, and various modifications are possible, for example, the pixel electrode 82 may include various materials and may have a single-layer structure or a multi-layer structure.

The pixel-defining layer 84 covering an edge region of the pixel electrode 82 may be disposed on the third insulating layer 72. The pixel-defining layer 84 includes an opening exposing at least a portion of the pixel electrode 82 and defines a pixel. The pixel-defining layer 84 may include an organic material, such as polyimide (PI) and HMDSO. The pixel-defining layer 84 may include a single layer or multiple layers.

The intermediate layer 86 is disposed on the pixel electrode 82 exposed by the pixel-defining layer 84. The intermediate layer 86 includes an organic emission layer, and may further include a functional layer, such as a hole injection layer (HIL), a hole transport layer (HTL), the organic emission layer, an electron transport layer, and an electron injection layer.

A structure of the intermediate layer 86 is not limited thereto, and may vary. The intermediate layer 86 may include a layer integrated throughout the plurality of pixel electrodes 82. For example, the intermediate layer 86 may include a single layer that is continuously formed over the plurality of pixel electrodes 82. In some embodiments, the intermediate layer 86 may include layers patterned to correspond to the plurality of pixel electrodes 82 respectively.

The opposite electrode 88 is disposed on the intermediate layer 86. Unlike the pixel electrode 82, the opposite electrode 88 may be integrally formed throughout the plurality of pixels PX. For example, the opposite electrode 88 may be an electrode that is continuously formed throughout the plurality of pixels PX. The opposite electrode 88 may be shared by the plurality of pixels PX.

The opposite electrode 88 may be a (semi-)transparent electrode. When the opposite electrode 88 is a (semi-)transparent electrode, the opposite electrode 88 may include at least one material selected from Ag, Al, Mg, Li, Ca, Cu, lithium fluoride/calcium (LiF/Ca), LiF/Al, MgAg, and CaAg, and may have a thin-film shape having a thickness of several to tens of nm. A configuration and material of the opposite electrode 88 are not limited thereto, and may vary.

A thin-film encapsulation layer 90 may be disposed on the opposite electrode 88. The thin-film encapsulation layer 90 seals the organic light-emitting diode OLED such that the organic light-emitting diode OLED is not exposed to external air or impurities, and has a very small thickness, thus may be used as encapsulation of a flexible display device capable of being bent or folded.

The thin-film encapsulation layer 90 may include a first inorganic layer 91, an organic layer 92, and a second inorganic layer 93, which are sequentially arranged on the opposite electrode 88. The first inorganic layer 91 may include silicon oxide, silicon nitride, and/or silicon oxynitride. The first inorganic layer 91 is formed according to a structure therebelow, and thus a top surface thereof may not be flat as shown in FIG. 3. The organic layer 92 may cover such a first inorganic layer 91 and form a flat top surface. The organic layer 92 may include at least one material selected from the group consisting of polyethylene terephthalate, polyethylene naphthalate, polycarbonate, polyimide, polyethylene sulfonate, polyoxymethylene, polyarylate, and HMDSO. The second inorganic layer 93 may cover the organic layer 92 and may include silicon oxide, silicon nitride, and/or silicon oxynitride. In FIG. 3, the thin-film encapsulation layer 90 includes only one organic layer 92, but the thin-film encapsulation layer 90 may have a structure in which a plurality of organic layers and a plurality of inorganic layers are alternately stacked.

A touch electrode layer TEL including touch electrodes may be disposed on the thin-film encapsulation layer 90, and an optical functional layer OFL may be disposed on the touch electrode layer TEL. The touch electrode layer TEL may obtain coordinate information according to an external input, for example, a touch event. The optical functional layer OFL may reduce reflectance of light (external light) incident from the outside towards the display device 1, and enhance color purity of light emitted from the display device 1.

According to an embodiment, the optical functional layer OFL may include a retarder and/or a polarizer. The retarder may be a film type or liquid crystal coating type, and may include a λ/2 retarder and/or a λ/4 retarder. The polarizer may also be a film type or a liquid crystal coating type. The film type may include an elongated synthetic resin film, and the liquid crystal coating type may include liquid crystals arranged in a certain arrangement. The retarder and the polarizer may further include a protection film.

According to an embodiment, the optical functional layer OFL may include a destructive interference structure. The destructive interference structure may include a first reflective layer and a second reflective layer arranged on different layers. First reflective light and second reflective light reflected respectively from the first reflective layer and the second reflective layer may destructively interfere with each other, and accordingly, reflectance of external light may be reduced.

An adhesive member may be arranged between the touch electrode layer TEL and the optical functional layer OFL. A general adhesive member known in the related art may be employed as the adhesive member without limitation. For example, the adhesive member may be a pressure sensitive adhesive (PSA).

The cover window CW may be disposed on the display layer DL. The cover window CW may be adhered to the display layer DL by an adhesive member. The adhesive member may be, for example, a PSA.

The cover window CW may have high transmissivity so as to transmit light emitted from the display layer DL. According to an embodiment, transmissivity of the cover window CW may be 85% or greater and transmission haze may be 2% or less, but the disclosure is not limited thereto.

Figure 4:
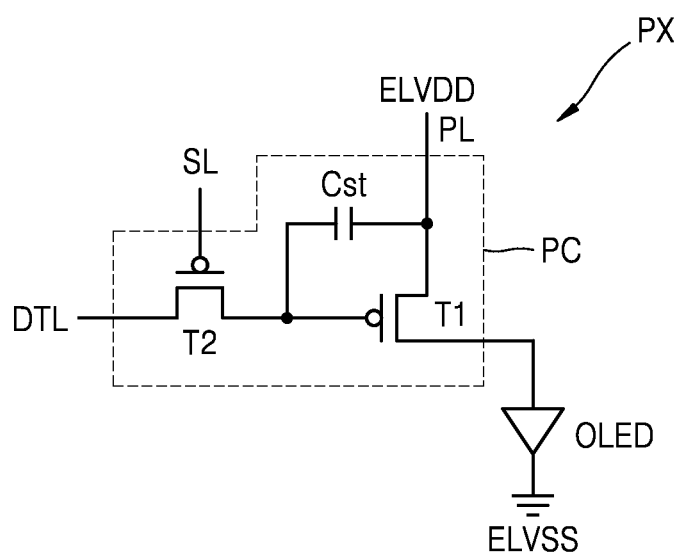
FIG. 4 is an equivalent circuit diagram of one pixel in a display panel, according to an embodiment of the present disclosure.

FIG. 4 is an equivalent circuit diagram of one pixel PX in a display panel, according to an embodiment.

Each pixel PX may include a pixel circuit PC, a display element, for example, the organic light-emitting diode OLED, connected to the pixel circuit PC. The pixel circuit PC may include a first thin-film transistor T1, a second thin-film transistor T2, and a storage capacitor Cst. Each pixel PX may be configured to emit, for example, red, green, blue, or white light through the organic light-emitting diode OLED.

The second thin-film transistor T2 is a switching thin-film transistor, is connected to a scan line SL and a data line DTL, and may be configured to transmit a data voltage input from the data line DTL to the first thin-film transistor T1, based on a switching voltage input from the scan line SL. The storage capacitor Cst is connected to the second thin-film transistor T2 and a driving voltage line PL, and may store a voltage corresponding to a difference between a voltage received from the second thin-film transistor T2 and a first power voltage ELVDD supplied to the driving voltage line PL.

The first thin-film transistor T1 is a driving thin-film transistor, is connected to the driving voltage line PL and the storage capacitor Cst, and may control a driving current flowing through the organic light-emitting diode OLED from the driving voltage line PL in response to a voltage value stored in the storage capacitor Cst. The organic light-emitting diode OLED may be configured to emit light of a certain luminance according to the driving current. An opposite electrode (for example, a cathode) of the organic light-emitting diode OLED may receive a second power voltage ELVSS.

In FIG. 4, the pixel circuit PC includes two thin-film transistors and one storage capacitor, but the disclosure is not limited thereto. The number of thin-film transistors and the number of storage capacitors may vary depending on a design of the pixel circuit PC. For example, the pixel circuit PC may further include four or more thin-film transistors, in addition to the two thin-film transistors described above.

Figure 5:
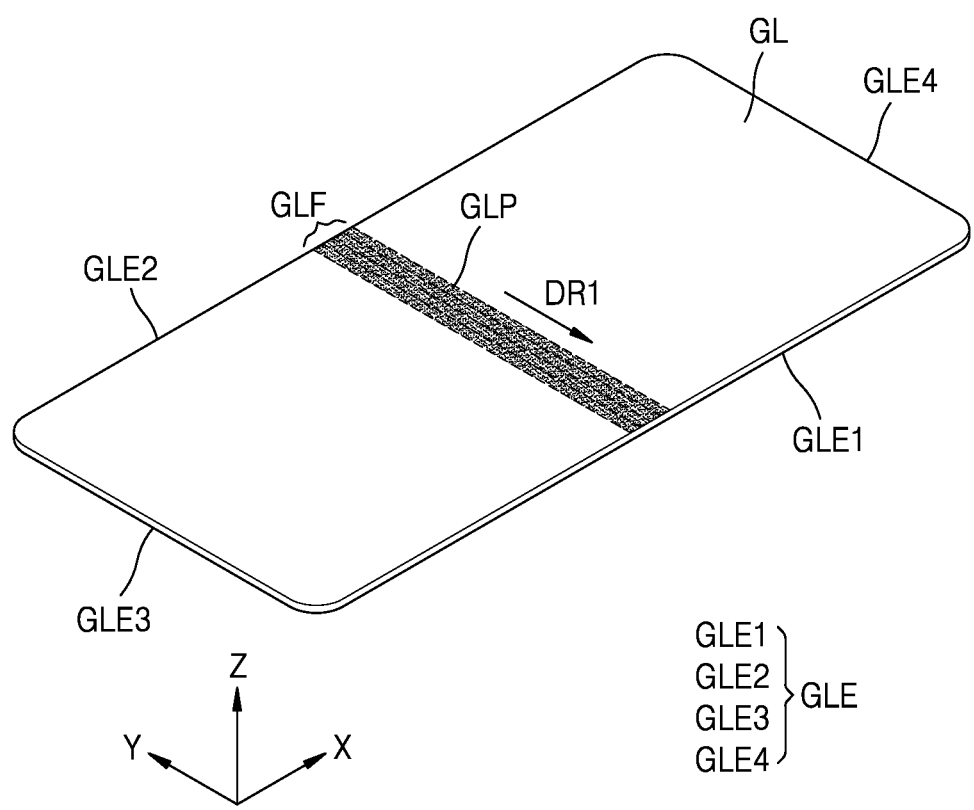
FIG. 5 is a perspective view of glass according to an embodiment of the present disclosure.

FIG. 5 is a perspective view of glass GL according to an embodiment.

The glass GL to be described below with reference to FIG. 5 may include the cover window CW as described with reference to FIG. 3. In some embodiments, the glass GL may correspond to the cover window CW of FIG. 3, and may also be referred to as a glass cover window.

The glass GL may include a folding region GLF folded based on the folding axis FAX as described with reference to FIG. 1. In some embodiments, the folding region GLF may be folded along or around the folding axis FAX. The folding region GLF may include a glass pattern GLP in a first direction DR1 (for example, the Y-axis direction). The first direction DR1 may be parallel to the folding axis FAX. The glass pattern GLP may be arranged in an engraved shape in the folding region GLF. In some embodiments, the glass pattern GLP may be patterns engraved in the folding region GLF. In other words, a thickness (i.e., an engraved depth) of the glass pattern GLP in the folding region GLF may be smaller than a thickness of remaining regions of the glass GL. In FIG. 5, there is only one folding region GLF, but this is only an example and a plurality of folding regions GLF may be spaced apart from each other.

For example, a plane shape of the glass GL may be a rectangle including four sides GLE in which vertexes are rounded. The sides GLE of the glass GL may include a first side GLE1, a second side GLE2 spaced apart from the first side GLE1, a third side GLE3 connecting one end of the first side GLE1 and one end of the second side GLE2, and a fourth side GLE4 connecting the other end of the first side GLE1 and the other end of the second side GLE2. However, this is only an example and a shape of the glass GL is not limited thereto. In some embodiments, the glass GL has a rectangle, having four sides GLE1 to GLE4 and four rounded corners. The first and second sides GLE1 and GLE2 are longer sides that are opposite and parallel. For example, the first and second sides GLE1 and GLE2 may extend along a straight line extending in the X-axis direction that is different from or perpendicular to the first direction DR1. The third and fourth sides GLE3 and GLE4 are shorter sides that are opposite and parallel. For example, the third and fourth sides GLE3 and GLE4 may extend along a straight line extending in the Y-axis direction that is parallel to the first direction DR1.

Figure 6:
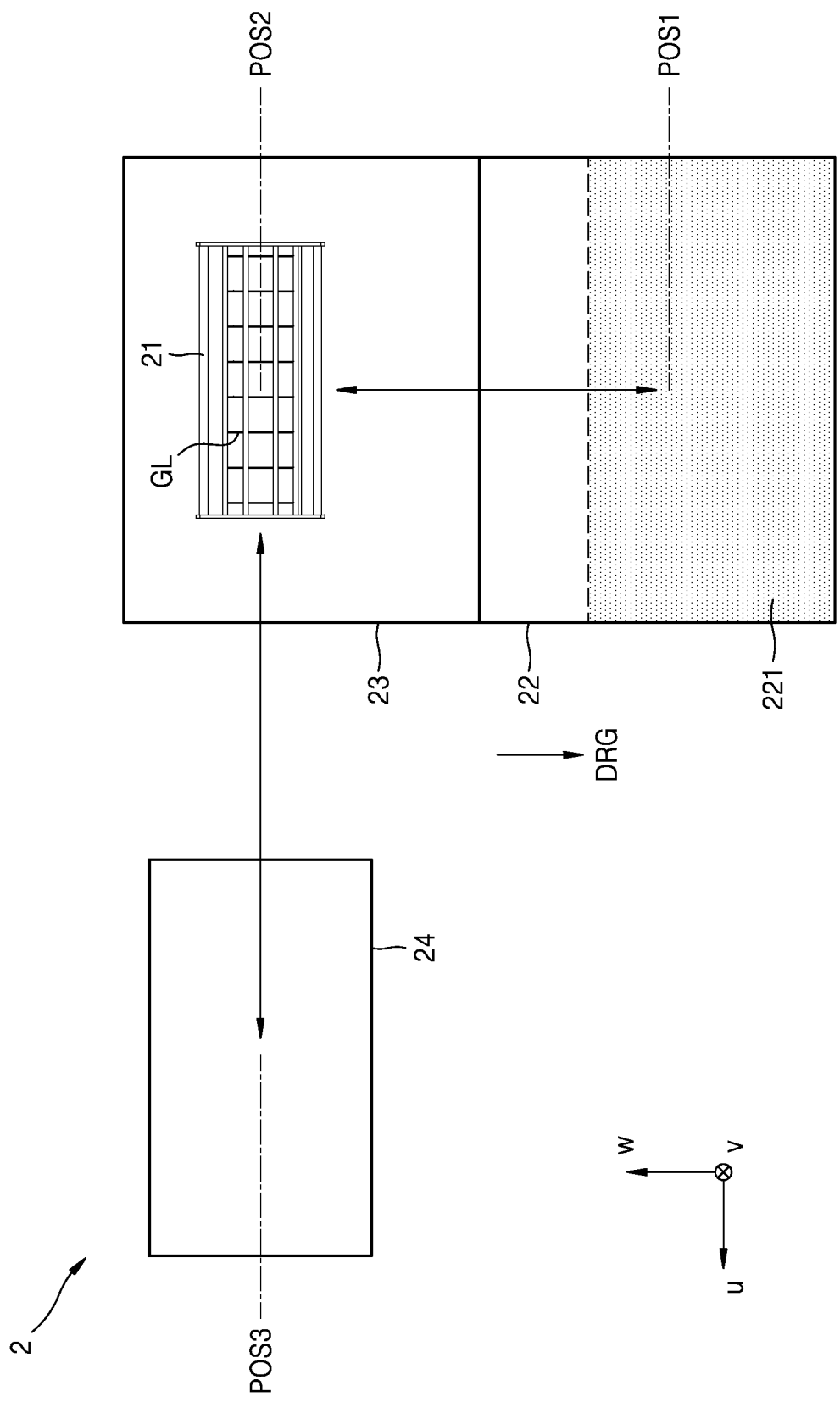
FIG. 6 is a cross-sectional view of an apparatus for manufacturing a display device, according to an embodiment of the present disclosure.

FIG. 6 is a cross-sectional view of an apparatus 2 for manufacturing a display device, according to an embodiment.

Referring to FIG. 6, the apparatus 2 may be an apparatus manufacturing the reinforced glass GL in which a strength characteristic is improved by performing a reinforcing process on the glass GL. Here, the reinforcing process is a chemical reinforcing process and may generate compressive strength in a surface region of the glass GL.

The apparatus 2 may include a stacking unit 21, a reinforcing unit 22, a heating unit 23, and a cooling unit 24. In some embodiments, the heating unit 23 may work by circulating a high-temperature fluid, and may include, for example, a heater that blows hot air. In some embodiments, the cooling unit 24 may work by circulating a low-temperature fluid, and may include, for example, a cooling device that circulates cool cooling water.

The stacking unit 21 may move between a first location POS1, a second location POS2, and a third location POS3, and may stack one or more pieces of glass GL. While the glass GL is stacked in the stacking unit 21, the first direction DR1 of FIG. 5 (for example, a −w-axis direction) of the glass pattern GLP of FIG. 5 may be parallel to a second direction DRG (for example, −w-axis direction) in which the gravity works. In other words, the stacking unit 21 may stack the glass GL such that the first direction DR1 is parallel to the second direction DRG, at the first location POS1, the second location POS2, and the third location POS3. Accordingly, a phenomenon in which the folding region GLF of the glass GL is folded due to the gravity may be reduced while the glass GL is stacked in the stacking unit 21.

The reinforcing unit 22 is arranged at the first location POS1 and may contain a reinforcing solution 221. The reinforcing unit 22 may include a space for accommodating the stacking unit 21 therein. In some embodiments, the reinforcing unit 22 may include a container with the reinforcing solution 221.

When the stacking unit 21 is located at the first location POS1, the glass GL stacked in the stacking unit 21 may be submerged in the reinforcing solution 221 contained in the reinforcing unit 22. The reinforcing solution 221 may include a first ion and the glass GL may include a second ion. The reinforcing solution 221 may be in a liquid state of a high temperature. When pores on surfaces of the pieces of glass GL submerged in the reinforcing solution 221 in the liquid state of a high temperature are expanded, the second ions in the pieces of glass GL may be externally discharged and the external first ions may fill spaces where the second ions have been discharged. Accordingly, an ion substitution process in which at least some of the second ions included in the surface of the glass GL are substituted with the first ions included in the reinforcing solution 221 may be performed.

An ion radius of the first ion included in the reinforcing solution 221 may be greater than an ion radius of the second ion included in the glass GL. In other words, by substituting ions on the surfaces of the pieces of glass GL with ions having relatively greater ion radii, compressive strength may be generated on surface regions of the pieces of glass GL, and thus strength characteristics of the pieces of glass GL may be increased.

The reinforcing solution 221 may include one selected from the group consisting of potassium nitride (KNO3) and sodium nitride (NaNO3), or may include a mixture of KNO3 and NaNO3. Also, the first ion included in the reinforcing solution 221 may be a potassium ion (K+) and the second ion included in the glass GL may be a sodium ion (Na+). However, an embodiment is not limited thereto, and a type of ion included in the glass GL and a type of ion included in the reinforcing solution 221 may vary.

The heating unit 23 is arranged at the second location POS2 and may increase an internal temperature. The heating unit 23 may include a space for accommodating the stacking unit 21 therein. The heating unit 23 may be disposed on the reinforcing unit 22. In other words, the first location POS1 may be spaced apart from the second location POS2 in the second direction DRG in which the gravity works (i.e., a gravitational force applies). The heating unit 23 and the reinforcing unit 22 may communicate with each other. For example, an opening portion may be arranged at a boundary between the heating unit 23 and the reinforcing unit 22. Accordingly, the stacking unit 21 may move from the first location POS1 to the second location POS2 through the opening portion when the ion substitution process described above is completed.

When the stacking unit 21 is located at the second location POS2, the heating unit 23 may heat the glass GL stacked in the stacking unit 21. When the ion substitution process is completed, residual salt may remain on the surface of the glass GL. The residual salt may coagulate on the surface of the glass GL and form a surface stress, thereby deteriorating quality of the glass GL and generating a defect in the glass GL. The heating unit 23 may maintain an internal temperature to a temperature equal to or greater than a melting point of the residual salt. Accordingly, the heating unit 23 may perform a residual salt removal process in which the residual salt remaining on the surface of the glass GL may be prevented from coagulating and removed by flowing and dropping out in the second direction DRG according to the gravity. The removed residual salt may be accommodated in the reinforcing unit 22 again and used as the reinforcing solution 221.

Here, because the first direction DR1 and the second direction DRG are parallel to each other at the second location POS2, a phenomenon in which the residual salt is gathered in the glass pattern GLP or at an end portion of the glass pattern GLP may be reduced. Accordingly, the residual salt may easily drop out in the second direction DRG from the glass GL.

The cooling unit 24 is arranged at the third location POS3 and may decrease an internal temperature. The cooling unit 24 may include a space for accommodating the stacking unit 21 therein. The cooling unit 24 may include an opening portion for taking the stacking unit 21 in or out. Accordingly, when the residual salt removal process described above is completed, the stacking unit 21 may move from the second location POS2 to the third location POS3 through the opening portion. When the stacking unit 21 is located at the third location POS3, the cooling unit 24 may perform a cooling process of cooling the glass GL stacked in the stacking unit 21. Accordingly, the reinforced glass GL may be stabilized.

Figure 7:
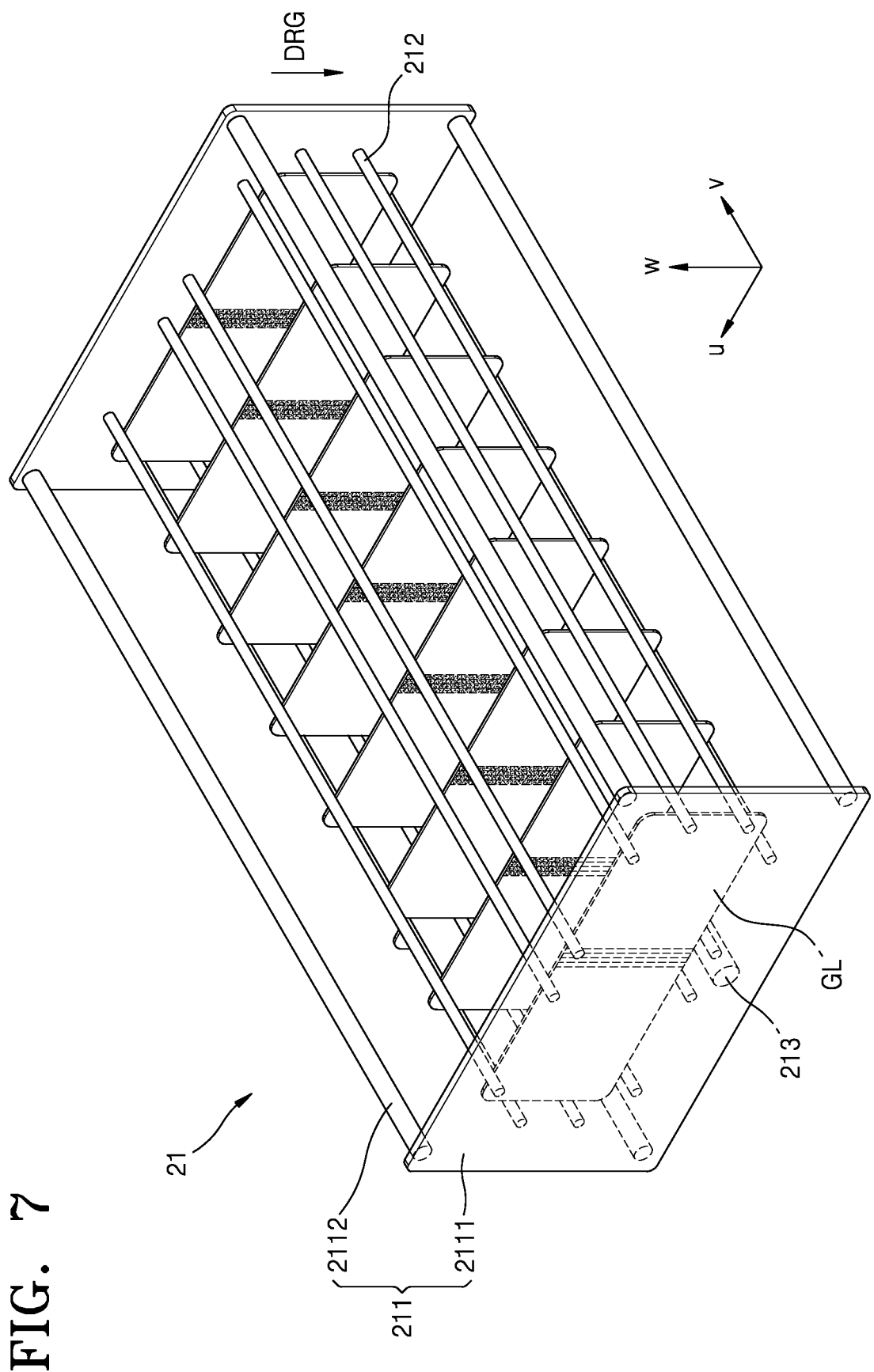
FIG. 7 is a perspective view of a stacking unit according to an embodiment of the present disclosure.
Figure 8:
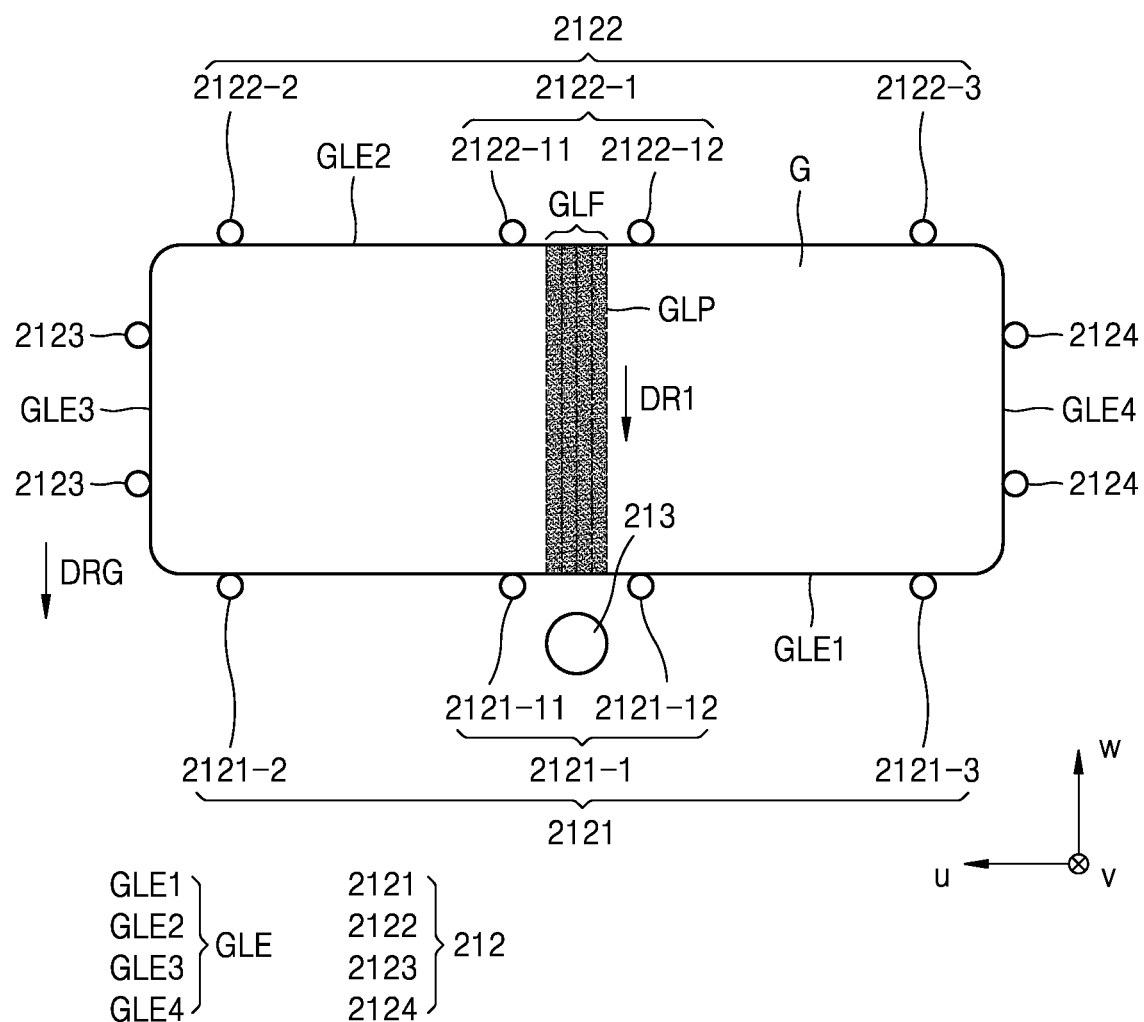
FIG. 8 is a cross-sectional view of a portion of a stacking unit, according to an embodiment of the present disclosure.

FIG. 7 is a perspective view of the stacking unit 21 according to an embodiment, and FIG. 8 is a cross-sectional view of a portion of the stacking unit 21, according to an embodiment.

Referring to FIGS. 7 and 8, the stacking unit 21 may include a stacking frame 211, a plurality of support portions 212 (i.e., a plurality of support rods or bars), and a heat transfer member 213.

The stacking frame 211 may form the exterior of the stacking unit 21 and provide an internal space. The stacking frame 211 may include a first frame 2111 and a second frame 2112.

In some embodiments, the stacking frame 211 may include a plurality of first frames 2111. For example, the stacking frame 211 may include two first frames 2111 of a plate shape. Two first frames 2111 may be spaced apart from each other while facing each other. For example, as shown in FIG. 7, a plane shape of the first frame 2111 may be a quadrangle greater than a plane shape of the glass GL. However, this is only an example and the plane shape of the first frame 2111 is not limited thereto.

In some embodiments, the stacking frame 211 may include a plurality of second frames 2112, and the second frames 2112 may connect the plurality of first frames 2111 with each other. For example, the second frame 2112 may connect two first frames 2111 with each other, which are spaced apart from each other while facing each other, to each other. For example, the stacking frame 211 may include four second frames 2112, and end portions of the second frames 2112 may be arranged at four vertexes of the first frame 2111 of which a plane shape is a rectangle. However, this is only an example, and the number and arrangement of the second frames 2112 are not limited thereto. In such a structure, the internal space may be arranged between the plurality of first frames 2111.

The plurality of support portions 212 may be connected to the stacking frame 211 to be arranged in the internal space, and may contact the sides GLE of the glass GL. In other words, the plurality of support portions 212 may be arranged along a circumference of the glass GL. The glass GL may be stably arranged in the internal space while being supported by the plurality of support portions 212. The plurality of support portions 212 may be connected to the plurality of first frames 2111. One end of each of the plurality of support portions 212 may be connected to one of the two first frames 2111, and the other end of each of the plurality of support portions 212 may be connected to the other one of the two first frames 2111. The plurality of support portions 212 may be spaced apart from the folding region GLF. Accordingly, a phenomenon in which damage is applied to the folding region GLF may be prevented as the folding region GLF and the plurality of support portions 212 contact each other.

The plurality of support portions 212 may include a first support portion 2121, a second support portion 2122, a third support portion 2123, and a fourth support portion 2124. When the glass GL is stacked in the stacking unit 21, the first side GLE1 may face the second direction DRG, the second side GLE2 may face a direction opposite to the second direction DRG, the third side GLE3 may face a direction crossing the second direction DRG, and the fourth side GLE4 may also face a direction crossing the second direction DRG.

The first support portion 2121 may support the first side GLE1 of the glass GL. Accordingly, the first support portion 2121 may prevent the glass GL being dropped from the stacking unit 21 in the second direction DRG due to the gravity. The first support portion 2121 may include a (1-1)th support portion 2121-1, a (1-2)th support portion 2121-2, and a (1-3)th support portion 2121-3.

The (1-1)th support portion 2121-1 may be arranged adjacent to the folding region GLF. The (1-1)th support portion 2121-1 may include a (1-11)th support portion 2121-11 and a (1-12)th support portion 2121-12. The (1-11)th support portion 2121-11 and the (1-12)th support portion 2121-12 may contact the first side GLE1 with the folding region GLF therebetween. In other words, while the first direction DR1 and the second direction DRG are parallel to each other, two of the plurality of support portions 212 may contact the sides GLE of the glass GL in the first direction DR1 with the folding region GLF therebetween. Accordingly, the plurality of support portions 212 may stably support the glass GL such that folding does not occur in the folding region GLF.

The (1-2)th support portion 2121-2 and the (1-3)th support portion 2121-3 may contact the first side GLE1 with the (1-1)th support portion 2121-1 therebetween. A distance between the folding region GLF and the (1-2)th support portion 2121-2 and a distance between the folding region GLF and the (1-3)th support portion 2121-3 may each be greater than a distance between the folding region GLF and the (1-1)th support portion 2121-1. Accordingly, the (1-2)th support portion 2121-2 and the (1-3)th support portion 2121-3 may reduce a phenomenon in which the glass GL wobbles or vibrates, thereby stably supporting the glass GL.

The second support portion 2122 may support the second side GLE2 of the glass GL. The second support portion 2122 may include a (2-1)th support portion 2122-1, a (2-2)th support portion 2122-2, and a (2-3)th support portion 2122-3.

The (2-1)th support portion 2122-1 may be arranged adjacent to the folding region GLF. The (2-1)th support portion 2122-1 may include a (2-11)th support portion 2122-11 and a (2-12)th support portion 2122-12. The (2-11)th support portion 2122-11 and the (2-12)th support portion 2122-12 may contact the second side GLE2 with the folding region GLF therebetween. Accordingly, the plurality of support portions 212 may stably support the glass GL such that folding does not occur in the folding region GLF.

The (2-2)th support portion 2122-2 and the (2-3)th support portion 2122-3 may contact the second side GLE2 with the (2-1)th support portion 2122-1 therebetween. A distance between the folding region GLF and the (2-2)th support portion 2122-2 and a distance between the folding region GLF and the (2-3)th support portion 2122-3 may each be greater than a distance between the folding region GLF and the (2-1)th support portion 2122-1. Accordingly, the (2-2)th support portion 2122-2 and the (2-3)th support portion 2122-3 may reduce a phenomenon in which the glass GL wobbles or vibrates, thereby stably supporting the glass GL.

The third support portion 2123 may support the third side GLE3 of the glass GL, and the fourth support portion 2124 may support the fourth side GLE4 of the glass GL. The third support portion 2123 and the fourth support portion 2124 may prevent a phenomenon in which the glass GL deviates in a direction towards the third side GLE3 or in a direction towards the fourth side GLE4, and may reduce a phenomenon in which the glass GL wobbles or vibrates, thereby stably supporting the glass GL. FIG. 8 shows two third support portions 2123 and two fourth support portions 2124, but this is only an example and the numbers of third support portions 2123 and fourth support portions 2124 are not limited thereto.

In other words, as the plurality of support portions 212 contact the four sides GLE of the glass GL, the plurality of support portions 212 may stably support the glass GL.

The heat transfer member 213 may be connected to the stacking frame 211 to be arranged in the internal space. One end of the heat transfer member 213 may be connected to one of the two first frames 2111, and the other end of the heat transfer member 213 may be connected to one of the two second frames 2112. The heat transfer member 213 may be spaced apart from the glass GL. Accordingly, a phenomenon in which the glass GL is damaged due to a contact between the heat transfer member 213 and the glass GL may be prevented.

The heat transfer member 213 may include a material having high thermal capacity. The heat transfer member 213 is heated by the reinforcing solution 221 at the first location POS1 and may be heated by the heating unit 23 at the second location POS2. While the cooling process described with reference to FIG. 6 is being performed, the heat transfer member 213 may be configured to transfer heat to the folding region GLF for a certain period of time, at the third location POS3. Accordingly, while the cooling process is being performed, the residual salt remaining adjacent to the folding region GLF may not coagulate, but may flow and drop out in the second direction DRG according to the gravity to be removed, due to latent heat of the heat transfer member 213. In some embodiments, the heat transfer member 213 may include or may be formed of at least one of aluminum, boron, titanium, carbon, chromium, nickel, silicon and copper.

The heat transfer member 213 may be spaced apart from the folding region GLF towards the first direction DR1. In other words, while the first direction DR1 is parallel to the second direction DRG at the third location POS3, the heat transfer member 213 may be spaced apart from the folding region GLF towards the second direction DRG. Accordingly, the residual salt remaining adjacent to the first side GLE1 among the folding region GLF may be efficiently removed.

Figure 9:
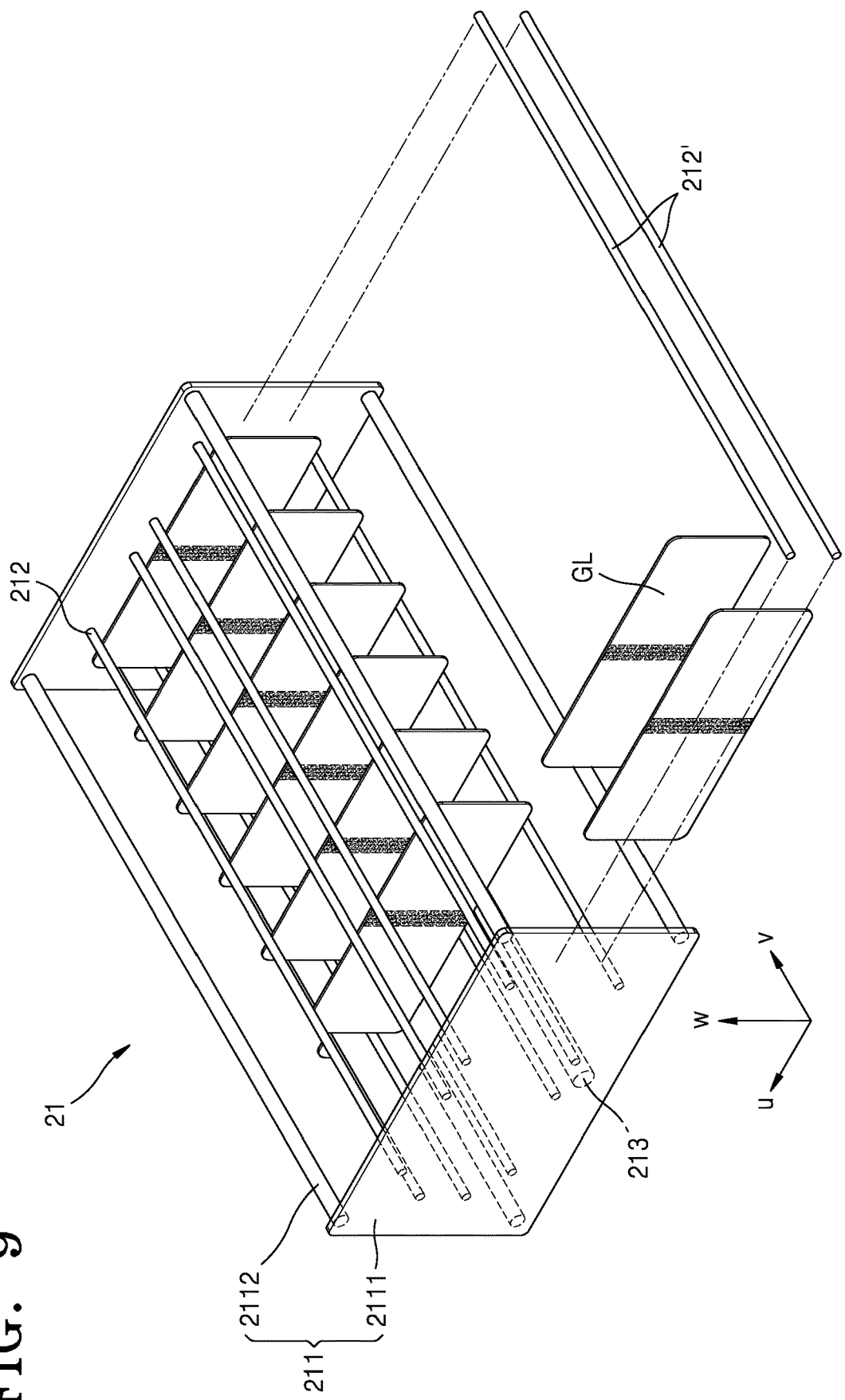
FIG. 9 is a perspective view of a stacking unit according to an embodiment of the present disclosure.

FIG. 9 is a perspective view of the stacking unit 21 according to an embodiment.

In FIG. 9, like reference numerals as FIG. 7 denote like elements, and thus redundant descriptions thereof are omitted.

Referring to FIG. 9, at least one support portion 212' among the plurality of support portions 212 may be detachable from the stacking frame 211. Both end portions of the at least one support portion 212' among the plurality of support portions 212 may be separated from the first frame 2111 and mounted on the first frame 2111 again.

The at least one support portion 212' among the plurality of support portions 212 may be separated from the stacking frame 211, and the glass GL on which the reinforcing process described with reference to FIG. 6 has been performed may be taken out from the stacking unit 21. Then, a new glass GL on which the reinforcing process is not performed may be stacked in the stacking unit 21. When the new glass GL is stacked in the stacking unit 21, the separated support portion 212' may be mounted on the stacking frame 211 again.

In FIG. 9, the detachable support portion 212' is illustrated as the fourth support portion 2124 of FIG. 8, but this is only an example and the number and arrangement of the detachable support portions 212' are not limited as long as the glass GL stacked in the stacking unit 21 is replaceable by the new glass GL.

Figure 10:
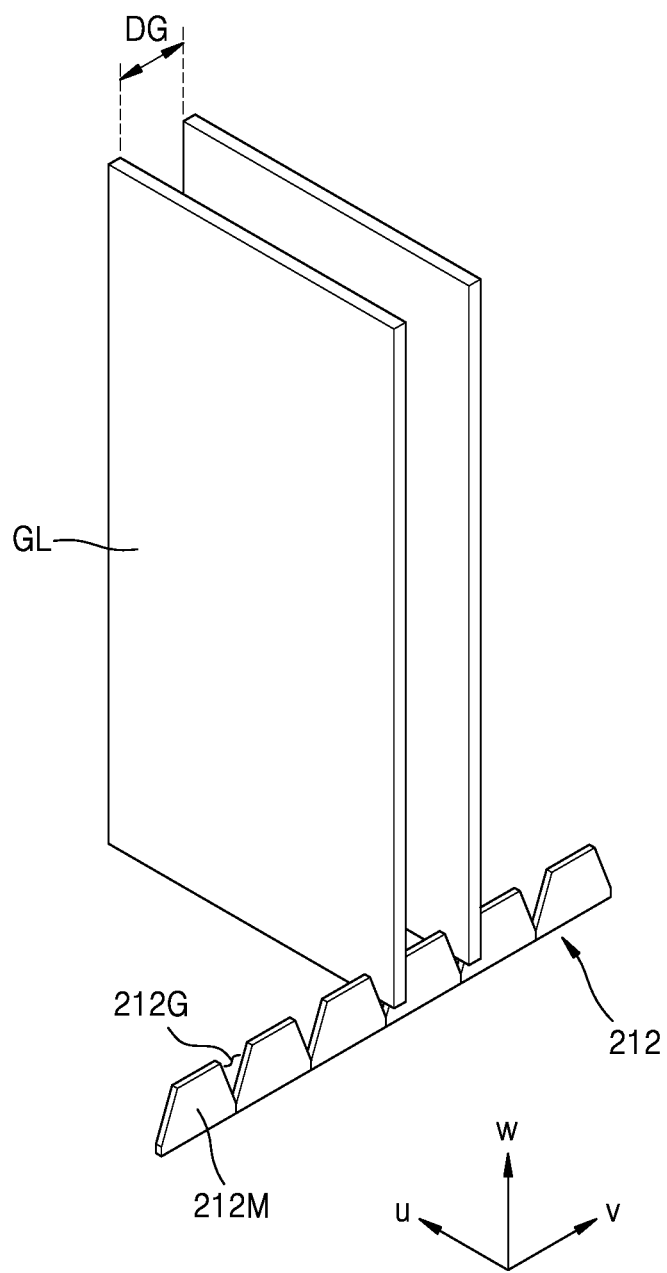
FIGS. 10 through 12 are perspective views of portions of a plurality of support portions, according to embodiments of the present disclosure.
Figure 11:
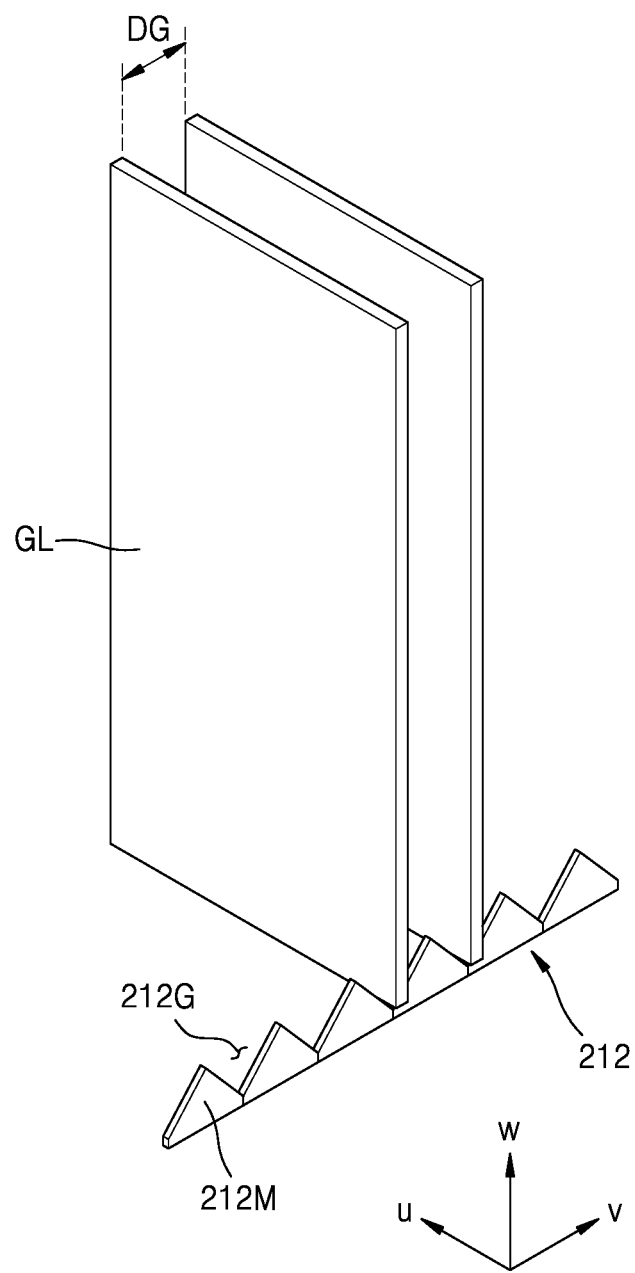
Figure 12:
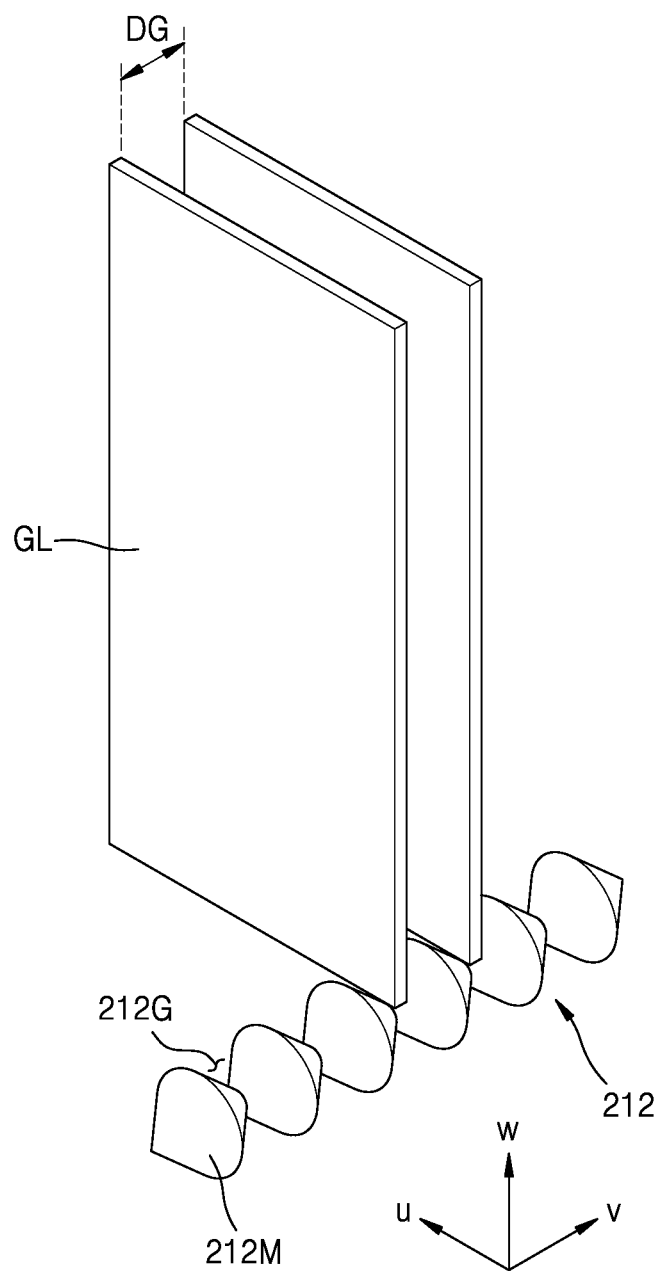

FIGS. 10 through 12 are perspective views of portions of the plurality of support portions 212, according to embodiments.

Referring to FIGS. 10 through 12, the plurality of pieces of glass GL may be stacked in the stacking unit 21 (see FIG. 6). A plurality of support grooves 212G accommodating the sides GLE of each of the plurality of pieces of glass GL may be arranged at the plurality of support portions 212.

In FIGS. 10 through 12, for convenience of descriptions, only one support portion 212 among the plurality of support portions 212 is illustrated.

The support portion 212 may include a plurality of support portion unit bodies 212M. The plurality of support portion unit bodies 212M may be linearly and repeatedly arranged. The support groove 212G may be arranged between the plurality of support portion unit bodies 212M. When there are three or more support portion unit bodies 212M, the plurality of support grooves 212G may be provided at a support interval DG. The plurality of support grooves 212G may accommodate the sides GLE of each of the plurality of pieces of glass GL. In such a structure, the plurality of pieces of glass GL may be stacked in the stacking unit 21 while being spaced apart from each other at the support interval DG. Thus, the reinforcing process of the glass GL described with reference to FIG. 6 may be simultaneously performed on the plurality of pieces of glass GL.

A shape of the support groove 212G may vary. For example, as shown in FIGS. 10 through 12, a plane shape of the support groove 212G may be a triangle. Accordingly, the support portion 212 may stably support the glass GL while reducing a contact area with the glass GL. However, this is only an example, and the shape of the support groove 212G is not limited thereto.

A shape of the support portion unit body 212M may vary. For example, as shown in FIG. 10, a plane shape of the support portion unit body 212M may be a trapezoid, or as shown in FIG. 11, the plane shape of the support portion unit body 212M may be a triangle. Alternatively, as shown in FIG. 12, the shape of the support portion unit body 212M may be a shape in which bottom surfaces of two cones are connected with each other. However, this is only an example, and the shape of the support portion unit body 212M is not limited thereto.

According to embodiments, a phenomenon in which residual salt coagulates on a surface of glass and forms surface stress, thereby deteriorating quality of the glass may be reduced.

According to embodiments, a phenomenon in which glass is folded during a reinforcing process, thereby deteriorating quality of the glass may be reduced.

The effects of the disclosure are not limited to those mentioned above, and other effects that are not mentioned may be clearly understood by one of ordinary skill in the art from the scope of claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An apparatus for manufacturing a display device, the apparatus comprising:
   a stacking frame assembly including a plurality of support portions, wherein the stacking frame assembly is configured to move to a first location, a second location, and a third location,
   a plurality of glass cover windows stacked in the stacking frame assembly, wherein each glass cover window of the plurality of glass cover windows includes a folding region having a glass pattern extending in a first direction and a remaining region adjacent to the folding region, and
   wherein the plurality of support portions is configured to support each glass cover window at the remaining region;
   a container arranged at the first location and containing a reinforcing solution such that the plurality of glass cover windows stacked in the stacking frame assembly are submerged in the reinforcing solution;
   a heater arranged at the second location and heating the plurality of glass cover windows stacked in the stacking frame assembly; and
   a cooler arranged at the third location and cooling the plurality of glass cover windows stacked in the stacking frame assembly,
   wherein, at the second location, the stacking frame assembly is arranged such that the first direction is parallel to a second direction in which a gravitational force is applied.

2. The apparatus of claim 1,
   wherein the stacking frame assembly comprises:
      a stacking frame providing an internal space,
      wherein the plurality of support portions is connected to the stacking frame and arranged in the internal space, and
   wherein the plurality of support portions contact sides of each glass cover window of the plurality of glass cover windows.

3. The apparatus of claim 2,
   wherein each support portion of the plurality of support portions is spaced apart from the folding region.

4. The apparatus of claim 3,
   wherein two support portions of the plurality of support portions contact two sides of each glass cover window of the plurality of glass cover windows, respectively, and
   wherein the two sides are spaced apart from each other in a direction perpendicular to the first direction, with the folding region between the two sides.

5. The apparatus of claim 2,
   wherein the sides of the plurality of glass cover windows include four sides of each glass cover window of the plurality of glass cover windows.

6. The apparatus of claim 2,
   wherein at least one of the plurality of support portions is detachable from the stacking frame.

7. The apparatus of claim 2,
   wherein each support portion of the plurality of support portions includes a plurality of support grooves accommodating a side of each glass cover window of the plurality of glass cover windows.

8. The apparatus of claim 2,
wherein the stacking frame assembly further comprises:
a heat transfer member connected to the stacking frame and arranged in the internal space, and
wherein the heat transfer member transfers heat to the folding region.

9. The apparatus of claim 8,
wherein the heat transfer member is spaced apart from the folding region in the first direction, and
wherein, at the third location, the stacking frame assembly is arranged such that the first direction is parallel to the second direction.

10. An apparatus for manufacturing a display device, the apparatus comprising a stacking unit configured to stack a plurality of glass cover windows, each glass cover window of the plurality of glass cover windows including a folding region having a glass pattern extending in a first direction,
wherein the stacking unit comprises:
a stacking frame providing an internal space;
a plurality of support portions connected to the stacking frame and arranged in the internal space and contacting sides of each glass cover window of the plurality of glass cover windows; and
a heat transfer member connected to the stacking frame and arranged in the internal space, wherein the heat transfer member transfers heat to the folding region.

11. The apparatus of claim 10,
wherein the heat transfer member is spaced apart from the folding region in the first direction.

12. The apparatus of claim 10,
wherein each support portion of the plurality of support portions is spaced apart from the folding region.

13. The apparatus of claim 12,
wherein two support portions of the plurality of support portions contact two sides of each glass cover window of the plurality of glass cover windows, respectively, and
wherein the two sides are spaced apart from each other in a direction perpendicular to the first direction, with the folding region between the two sides.

14. The apparatus of claim 10,
wherein the sides of the plurality of glass cover windows include four sides of each glass cover window of the plurality of glass cover windows.

15. The apparatus of claim 10,
wherein at least one of the plurality of support portions is detachable from the stacking frame.

16. The apparatus of claim 10,
wherein each support portion of the plurality of support portions includes a plurality of support grooves accommodating a side of each glass cover window of the plurality of glass cover windows.

17. A method of manufacturing a display device, the method comprising:
stacking, in a stacking frame assembly, a plurality of glass cover windows, each glass cover window of the plurality of glass cover windows including a folding region having a glass pattern extending in a first direction and a remaining region adjacent to the folding region, wherein the stacking frame assembly includes a plurality of support portions configured to support each glass cover window at the remaining region;
immersing the stacking frame assembly in a reinforcing solution such that the plurality of glass cover windows stacked in the stacking frame assembly are submerged in the reinforcing solution;
heating the plurality of glass cover windows stacked in the stacking frame assembly; and
cooling the plurality of glass cover windows stacked in the stacking frame assembly,
wherein the heating of the plurality of glass cover windows stacked in the stacking frame assembly comprises arranging the stacking frame assembly such that the first direction is parallel to a second direction in which a gravitational force is applied.

18. The method of claim 17,
wherein the cooling of the plurality of glass cover windows stacked in the stacking frame assembly comprises:
arranging the stacking frame assembly such that the first direction is parallel to the second direction.

19. The method of claim 18,
wherein the cooling of the plurality of glass cover windows stacked in the stacking frame assembly further comprises: transferring heat to the folding region.

20. The method of claim 17, further comprising:
separating at least one of the plurality of support portions connected to a stacking frame and contacting sides of each glass cover window of the plurality of glass cover windows from the stacking frame;
taking the plurality of glass cover windows out of the stacking frame assembly;
stacking new glass cover windows in the stacking frame assembly; and
mounting the separated at least one support portion on the stacking frame.

* * * * *